(12) United States Patent
Yaqub

(10) Patent No.: US 10,878,430 B1
(45) Date of Patent: *Dec. 29, 2020

(54) ANTI-SKIMMING CARD READER COMPUTING DEVICE

(71) Applicant: Wells Fargo Bank, N.A., San Francisco, CA (US)

(72) Inventor: Raziq Yaqub, Stewartsville, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,448

(22) Filed: Apr. 15, 2019

Related U.S. Application Data

(63) Continuation of application No. 15/664,919, filed on Jul. 31, 2017, now Pat. No. 10,262,326.

(51) Int. Cl.
  *G06K 5/00* (2006.01)
  *G06Q 30/00* (2012.01)
  *G06Q 50/26* (2012.01)

(52) U.S. Cl.
  CPC ....... *G06Q 30/0185* (2013.01); *G06Q 50/265* (2013.01)

(58) Field of Classification Search
  CPC ........ G07F 7/1008; G07F 7/08; G06Q 20/341
  USPC ...................................................... 235/380
  See application file for complete search history.

(56) References Cited

U.S. PATENT DOCUMENTS

| | | | |
|---|---|---|---|
| 7,458,516 B2 | 12/2008 | Masterton et al. | |
| 7,995,791 B2 | 8/2011 | Flook et al. | |
| 8,931,698 B2 | 1/2015 | Ishikawa et al. | |
| 8,953,045 B2 | 2/2015 | Priesterjahn et al. | |
| 9,564,985 B2 | 2/2017 | Ray et al. | |
| 9,892,293 B1* | 2/2018 | Wade | G06K 7/10277 |
| 2007/0200928 A1 | 8/2007 | O'Doherty et al. | |
| 2013/0154612 A1* | 6/2013 | Clark | G07F 19/2055 324/76.77 |
| 2013/0299586 A1 | 11/2013 | Yesil et al. | |

(Continued)

OTHER PUBLICATIONS

"Anti-Skimming Protection for Your ATM," Cummins Allison Corp, accessed from http://www.cumminsallison.com/us/en/products/atm/anti-skim on Apr. 4, 2017, 2 pages.

(Continued)

*Primary Examiner* — Ahshik Kim

(74) *Attorney, Agent, or Firm* — Shumaker & Sieffert, P.A.

(57) ABSTRACT

A computing device that includes a card reader component including a card reader, a plurality of micro cameras positioned proximate to the card reader, a battery detector circuit, and processing circuitry in communication with the card reader component, the plurality of micro cameras, and the battery detector circuit is described. The processing circuitry is configured to analyze one or more images captured by the plurality of micro cameras, determine that one or more of the images captured by the plurality of micro cameras is obscured, in response to the determination that the one or more of the images of the plurality of micro cameras is obscured, initiate the battery detector circuit, and in response to the battery detector circuit detecting a presence of an external battery near the card reader, determine that a skimming device is affixed over the card reader component.

20 Claims, 6 Drawing Sheets

(56) References Cited

U.S. PATENT DOCUMENTS

| | | | |
|---|---|---|---|
| 2014/0158768 A1* | 6/2014 | Ray | H04K 3/825 |
| | | | 235/449 |
| 2014/0232863 A1 | 8/2014 | Paliga et al. | |
| 2015/0302707 A1 | 10/2015 | Wiesinger et al. | |
| 2016/0162712 A1 | 6/2016 | Ozawa et al. | |
| 2018/0060578 A1* | 3/2018 | Kim | G06F 21/86 |
| 2018/0336756 A1* | 11/2018 | MacKinnon | G07F 9/02 |

OTHER PUBLICATIONS

"I Am for the NCR Skimming Protection Solution," NCR Secure Solution, accessed from www.ncr.com accessed on Apr. 5, 2017.

"Measuring Static Magnetic Fields," THM1176-PDA, Metrolab, Narda Safety Test Solutions, accessed from http://www.narda-sts.us/pdf_files/DataSheets/DS_THM1176-PDA_EN.pdf on Nov. 8, 2017, 6 pp.

Paramter, "Voltage and Battery Detectors," Maxim Integrated, accessed from https://www.maximintegrated.com/en/products/power/supervisors-voltage-monitors-sequencers/voltage-battery-detectors.html on Nov. 8, 2017, 2 pp.

Prosecution History from U.S. Appl. No. 15/664,919, dated Jan. 22, 2018 through Mar. 1, 2019, 46 pp.

\* cited by examiner

ANTI-SKIMMING CARD READER COMPUTING DEVICE

This application is a continuation of U.S. application Ser. No. 15/664,919, filed Jul. 31, 2017, the contents of which are hereby incorporated by reference in their entirety.

TECHNICAL FIELD

The disclosure relates to automatic teller machines and other computing devices having card readers.

BACKGROUND

Computing devices including card readers allow a user to perform financial transactions themselves without the need for an in-person cashier or bank teller. In some examples, the computing devices including card readers may be "pay at the pump" gasoline terminals at gas stations or "self-checkout" terminals in grocery or retail stores. In other examples, the computing devices including card readers may be automatic teller machines (ATMs) associated with financial institutions. In order to utilize such computing devices, a user may insert a credit or debit card that contains identifying information. The identifying information may include the user's name, account number, or the like. The identifying information may be contained in a magnetic stripe of the card that is read by the card reader on the computing device upon insertion of the card. The user may also enter a personal identification number (PIN) in order to further verify their identify for the transaction.

As electronic transactions become more popular, such as those occurring at gas stations or ATMs, the opportunities for fraud and/or identity theft may also become more prevalent. One method of capturing another person's identifying information or bank account information is through the use of skimming devices on ATMs and other computing devices having card readers. A skimming device may be affixed over a card reader or a card reader component to capture a user's identifying information upon insertion of the user's card past or through the skimming device and into the card reader or card reader component. The skimming device may be discrete and still allow the ATM or other computing device to perform the desired transaction using the card reader so that the user does not suspect any wrong doing. The skimming device may read the identifying information contained in the magnetic stripe and store it and/or send it to a device associated with someone other than the user, i.e., a bad actor or fraudster. The skimming device may also include a camera used to obtain the user's PIN as it is entered on a keypad of the ATM or other computing device. In this way, the bad actor capturing the user information may obtain all of the user's identifying information needed to access the user's account or financial information.

SUMMARY

In general, this disclosure describes an anti-skimming computing device configured to detect a presence of a skimming device affixed over a card reader component of the computing device. The anti-skimming computing device may be an automatic teller machine (ATM), a "pay at the pump" gas station terminal, a "self-checkout" store terminal, or another computing device having a card reader. According to the techniques described in this disclosure, the anti-skimming computing device uses a two-stage process to detect the presence of a skimming device affixed over a card reader component that includes the card reader of the anti-skimming computing device. As a first stage, the anti-skimming computing device uses a plurality of micro cameras positioned proximate to the card reader to determine whether one or more of the images of the micro cameras is at least partially obscured. As a second stage, based on the determination that an object is obscuring the image of one or more of the micro cameras, the anti-skimming computing device initiates a battery detector circuit to detect whether an external battery is present near the card reader. The detected presence of an external battery coupled with the object that is obscuring the images of the micro cameras indicates that a skimming device is affixed over the card reader component.

In one example, a computing device includes a card reader component including a card reader, a plurality of micro cameras positioned proximate to the card reader, a battery detector circuit, and processing circuitry in communication with the card reader component, the plurality of micro cameras, and the battery detector circuit, where the processing circuitry is configured to analyze one or more images captured by the plurality of micro cameras, determine that one or more of the images captured by the plurality of micro cameras is obscured, in response to the determination that the one or more of the images of the plurality of micro cameras is obscured, initiate the battery detector circuit, and in response to the battery detector circuit detecting a presence of an external battery near the card reader, determine that a skimming device is affixed over the card reader component.

In another example, a method includes analyzing, by a computing device having a card reader component including a card reader, one or more images captured by a plurality of micro cameras positioned on the computing device proximate to the card reader, determining, by the computing device, that one or more of the images captured by the plurality of micro cameras is obscured, in response to the determination that the one or more of the images of the plurality of micro cameras is obscured, initiating a battery detector circuit included in the computing device, and in response to the battery detector circuit detecting a presence of an external battery near the card reader, determining that a skimming device is affixed over the card reader component of the computing device.

In yet another example, a server device includes a memory and one or more programmable processors in communication with the memory and configured to receive, from a computing device, a notification that a skimming device is affixed over a card reader component of the computing device, and in response to the notification, send instructions to one or more support servers to initiate a plurality of surveillance cameras located in a surrounding area of the computing device and send instructions to the computing device to enact one or more security measures to prevent transactions using the card reader component of the computing device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
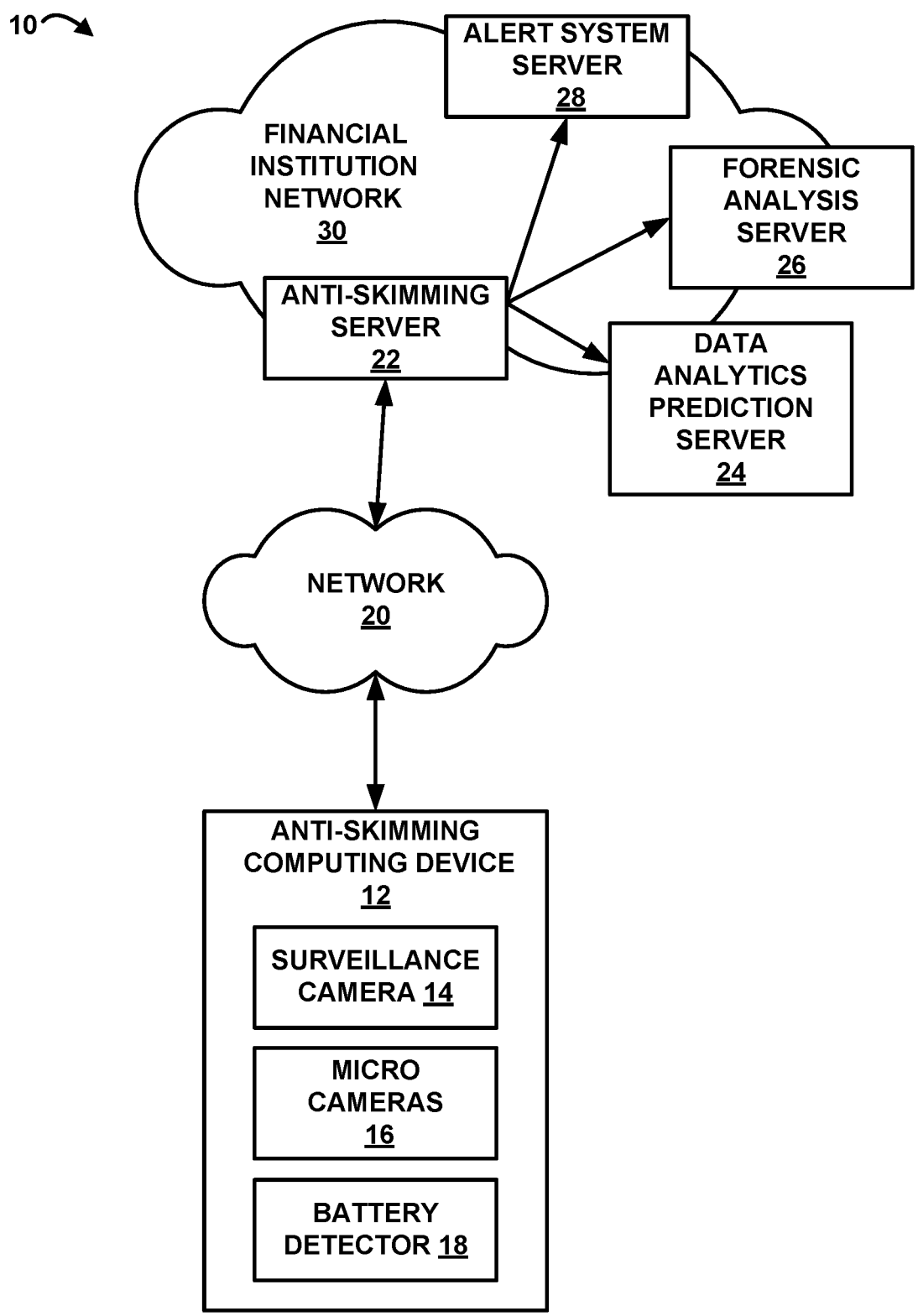
FIG. 1 is a block diagram illustrating an example network system including an anti-skimming computing device, in accordance with aspects of the disclosure.

FIG. 1 is a block diagram illustrating an example network system 10 including an anti-skimming computing device 12, in accordance with aspects of the disclosure. Network system 10 includes anti-skimming computing device 12 in communication with an anti-skimming server 22 of a financial institution via a network connection. Financial institution network 30 includes anti-skimming server 22 and anti-skimming support servers such as an alert system server 28, a forensic analysis server 26, and a data analytics prediction server 24.

As shown in FIG. 1, anti-skimming computing device 12 is in communication with anti-skimming server 22 via a network connection over network 20. In some examples, network 20 may be a private network or a public network, such as the Internet. Although illustrated as a single entity, network 20 may include a combination of two or more public and/or private networks. Network 20 may include one or more of a wide area network (WAN) (e.g., the Internet), a local area network (LAN), a virtual private network (VPN), or another wired or wireless communication network. In some examples, network 20 may be a service provider network coupled to one or more networks administered by other providers, and may thus form part of a large-scale public network infrastructure, e.g., the Internet.

Anti-skimming computing device 12 includes a card reader which may allow a user to perform financial transactions without the need for an in-person cashier or bank teller. In some examples, the card reader is included within a card reader component. The card reader component may further include a card slot, a protective housing or face, a card shutter, or the like. Anti-skimming computing device 12 may be a device used to perform a variety of transactions and/or account balance checks. For example, anti-skimming computing device 12 may be an automatic teller machine (ATM), a "pay at the pump" gas station terminal, a "self-checkout" store terminal, or another computing device having a card reader. Anti-skimming computing device 12 may be located at a retail banking location, a gas station, a grocery store, a mall, a college campus, or any other suitable location.

Anti-skimming computing device 12 may include a display for displaying information and/or receiving inputs. For example, the display may present a user with a graphical user interface (GUI) that displays options for completing one or more transactions. In some examples, the display may include a touchscreen for receiving information from the user indicating a selection via the displayed GUI. Alternatively, or additionally, anti-skimming computing device 12 may include a keypad or other input device for receiving inputs.

Anti-skimming computing device 12 may include components for vending or accepting cash and/or checks for various transactions including, for example, conventional deposits or withdrawals, exchange of local currency for foreign currency or vice versa, and/or withdrawal of foreign currency. Anti-skimming computing device 12 may include a printer component for printing documents for various transactions including, for example, receipts for deposits, receipts for withdrawals, receipts for purchases, or the like. Anti-skimming computing device 12 may include a component to dispense envelopes. Anti-skimming computing device 12 may also include a component to dispense cash and/or a component to dispense cash within an envelope.

The components of anti-skimming computing device 12 described herein may be separate components, each dedicated to a separate function, or may be combined in any suitable number of components to perform the functions described herein. A single component may include different subcomponents used for performing different tasks or may use the same subcomponents for each task according to particular needs.

Anti-skimming computing device 12 includes a surveillance camera 14, a plurality of micro cameras 16, and a battery detector 18. According to the techniques described in this disclosure, anti-skimming computing device 12 uses a two-stage process to detect the presence of a skimming device affixed over a card reader component. The card reader component includes a card reader used to performed transactions. As a first stage, anti-skimming computing device 12 uses plurality of micro cameras 16 positioned proximate to the card reader to determine whether the images from one or more of the plurality of micro cameras 16 is at least partially obscured. In some examples, an obscured image may include an image that is blocked, blurred, darkened, fuzzy, or the like. As a second stage, based on the determination that an object is obscuring the image of one or more of the plurality of micro cameras 16, anti-skimming computing device 12 initiates a battery detector 18 to detect whether an external battery is present near the card reader. The detected presence of an external battery near the card reader coupled with the object that is obscuring the image of the plurality of micro cameras 16 indicates that a skimming device is affixed over the card reader component. Anti-skimming computing device 12 including surveillance camera 14, plurality of micro cameras 16, and battery detector 18 will be described in more detail with respect to FIGS. 2-4 below.

Anti-skimming computing device 12 may perform additional functions in response to determining that a skimming device is present in order to prevent a user from performing transactions using the card reader and getting his or her identifying information captured by the skimming device. For example, anti-skimming computing device 12 may close a shutter over the card reader component to prevent insertion of a card and/or present an "out of operation" message on a display of the computing device to discourage the user from inserting a card. Additionally, or alternatively, anti-skimming computing device 12 may initiate surveillance camera 14 in an attempt to capture one or more images of a bad actor installing the skimming device over the card reader component and/or send a notification of the detected skimming device to one or more servers 22 and/or support servers 24, 26, 28 to be used for fraud analysis and alerting the appropriate authorities.

Anti-skimming server 22, alert system server 28, forensic analysis server 26, and/or data analytics prediction server 24 may be associated with a financial institution and included within financial institution network 30. The financial institution associated with anti-skimming server 22 may be a traditional bank or credit union with the capability to maintain user accounts, or a credit card company with the capability to issue credit and debit accounts. For example, the financial institution may maintain checking, savings, and/or investment accounts for account holders. Anti-skimming server 22 and other similar servers (not shown) of financial institution network 30 may be able to access to customer accounts held by the financial institution and/or accounts at other financial institutions via financial institution network 30. In some cases, anti-skimming server 22 and support servers 24, 26, 28 may be associated with an organization other than a financial institution. For example, anti-skimming server 22 and support servers 24, 26, 28 may be associated with a third-party organization, such as an organization that tracks and/or detects fraud on behalf of a financial institution. Anti-skimming server 22 may be in communication with alert system server 28, forensic analysis server 26, and data analytics prediction server 24 via network 20, a wide area network (WAN) (e.g., the Internet), a local area network (LAN), a virtual private network (VPN), or another wired or wireless communication network. Although anti-skimming server 22 and support servers 24, 26, 28 are illustrated as being included within financial institution network 30, in some examples, one or more of anti-skimming server 22 or support servers 24, 26, 28 may be owned by other parties and in communication with each other via network 20.

Anti-skimming server 22 may be able to access data related to financial institution network 30. For example, anti-skimming server 22 may be able to access information related to accounts of one or more users associated with a financial institution. The accounts may be checking accounts, savings accounts, investment accounts, or the like. Anti-skimming server 22 may perform authentication of a user of anti-skimming computing device 12 using the accessible data related to financial institution network 30 prior to completing a transaction. Anti-skimming server 22 may authenticate the user using an account number, a personal identification number (PIN), biometric data, or the like.

Anti-skimming server 22 may also receive alerts from anti-skimming computing device 12 via network 20 regarding fraudulent activity at anti-skimming computing device 12, e.g., the presence of a skimming device. Anti-skimming server 22 may send an alert to one or more of alert system server 28, forensic analysis server 26, or data analytics prediction server 24. Anti-skimming server 22 may receive instructions from alert system server 28, forensic analysis server 26, and/or data analytics prediction server 24 in response to the alert. The instructions may be transmitted to anti-skimming computing device 12. For example, the instructions may be for anti-skimming computing device 12 to display an "out of operation" message or to resume normal operation. In some examples, the instructions to display the "out of operation" message may also cause anti-skimming computing device 12 to lock one or more user interface devices, such as a display and/or a keypad, and/or close a shutter over the card reader component to prevent transactions from occurring using the card reader of anti-skimming computing device 12.

Anti-skimming server 22 may be a dedicated server configured to handle anti-skimming functions performed by anti-skimming computing device 12. In other examples, anti-skimming server 22 may be an existing server that is modified, e.g., using software, to be able to operate in accordance with aspects of this disclosure. Anti-skimming server 22 may act as one of many points of contact between financial institution network 30, support servers 24, 26, 28, and anti-skimming computing device 12, or may be a single point of contact between financial institution network 30, support servers 24, 26, 28, and anti-skimming computing device 12.

Anti-skimming server 22 may be in communication with anti-skimming computing device 12, or anti-skimming server 22 may be in communication with other computing devices in addition to anti-skimming computing device 12. The other computing devices may or may not include the anti-skimming capabilities as described herein. Anti-skimming server 22 being in communication with more than one computing device may allow anti-skimming server 22, alert system server 28, forensic analysis server 26, and data analytics server 24 to communicate with, obtain, and analyze data from multiple computing devices. Communication and data from multiple computing devices may help the servers and/or a financial institution understand, combat, and protect against skimming attacks.

Alert system server 28 may be used to send a notification to an authority upon receiving an alert relating to detection of a skimming device affixed to anti-skimming computing device 12. The notification may be sent through an email, a text message, or the like to notify an authority, such as, for example, an employee of the financial institution, of the skimming device. Alert system server 28 may also be in wireless or wired communication with financial institution network 30 to transmit the notification. One or more employees of financial institution network 30 may receive the notification. In some examples, the one or more employees may determine an appropriate action to take, such as, for example, alerting the police or searching anti-skimming computing device 12 for a skimming device in person. Additionally, or alternatively, alert system server 28 may send the notification to the police, Federal Bureau of Investigation (FBI), or another fraud tracking/criminal investigation group of the detection of a skimming device affixed to anti-skimming computing device 12.

Forensic analysis server 26 may trigger one or more surrounding surveillance cameras to begin recording upon receipt of the alert from anti-skimming server 22. The surrounding surveillance cameras may be, for example, surveillance cameras located around anti-skimming computing device 12 on neighboring buildings, such as a bank where anti-skimming computing device 12 may be located. A financial institution may own the surrounding surveillance cameras to be operated in accordance with aspects of this disclosure. Forensic analysis server 26 may configure the surrounding surveillance cameras to turn on, begin recording, or operate specifically to help combat a skimming attack. For example, the surrounding surveillance cameras may be configured to attempt to capture images or a video of a bad actor who may have affixed a skimming device on anti-skimming computing device 12. The surrounding surveillance cameras may include sensors to help direct the cameras in an attempt to capture the desired images. For example, the surrounding surveillance cameras may include one or more motion detectors to direct the cameras to a bad actor running away from anti-skimming computing device 12, to a license plate of a car leaving the area, or the like. In some examples, one or more surrounding surveillance cameras may be initiated preemptively. For example, if anti-skimming computing device 12 detects an affixed skimming device, one or more surrounding surveillance cameras near other computing devices within a vicinity of anti-skimming computing device 12 may be initiated. In this way, the surrounding surveillance cameras may be able to capture an image of a bad actor who may be attempting to attack multiple computing devices by attacking skimming devices. Forensic analysis server 26 may store the videos or transmit the videos to alert system server 28, e.g., for delivery to a financial institution and/or an authority.

Forensic analysis server 26 may receive images and/or videos captured by a plurality of micro cameras 16 and/or a surveillance camera 14 on anti-skimming computing device 12 and store them or transmit them to alert system server 28. In some examples, forensic analysis server 26 may transmit instructions to anti-skimming server 22 to instruct anti-skimming computing device 12 to initiate surveillance camera 14 and begin recording, such as, for example, as a preemptive measure if a future skimming attack is suspected. In some examples, forensic analysis server 26 may store the data received by anti-skimming server 22 pertaining to the skimming attack. In this way, an authority, investigator, or the like, may be able to access data and/or information that may help determine the identity, location, and/or other information about the bad actor responsible for the skimming attack.

Data analytics prediction server 24 may receive data from anti-skimming server 22 and/or forensic analysis server 26. Data analytics prediction server 24 may use the data to detect a pattern in one or more skimming attacks, predict when or where another skimming attack may take place, preemptively alert forensic analysis server 26 to initiate surveillance cameras prior to a skimming device being detected, or provide recommendations to a financial institution. For example, data analytics prediction server 24 may use Geographic Information Systems (GIS), Raster GIS, point processing, linear regression, and/or exponential smoothing models to predict trends and/or behavior patterns of bad actors and/or skimming attacks. In some examples, data analytics prediction server 24 may use the data received from anti-skimming server 22 to extract diversified information that may help detect patterns and/or predict a future skimming attack. For example, data analytics prediction server 24 may extract information such as the location of anti-skimming computing device 12, the time that a suspected skimming attack was initiated, the sequence of anti-skimming computing devices that were attacked (e.g., in the case where skimming devices were detected on more than one anti-skimming computing device), and the like. In some examples, data analytics prediction server 24 may use predictive analytics, statistics, high-speed processing, and combinations thereof in order detect a pattern in skimming attacks and/or predict a future skimming attack.

In some examples, anti-skimming server 22, alert system server 28, forensic analysis server 26, and data analytics prediction server 24 are all separate servers. In other examples, anti-skimming server 22, alert system server 28, forensic analysis server 26, and/or data analytics prediction server 24 may be separate units within one or more servers.

Figure 2:
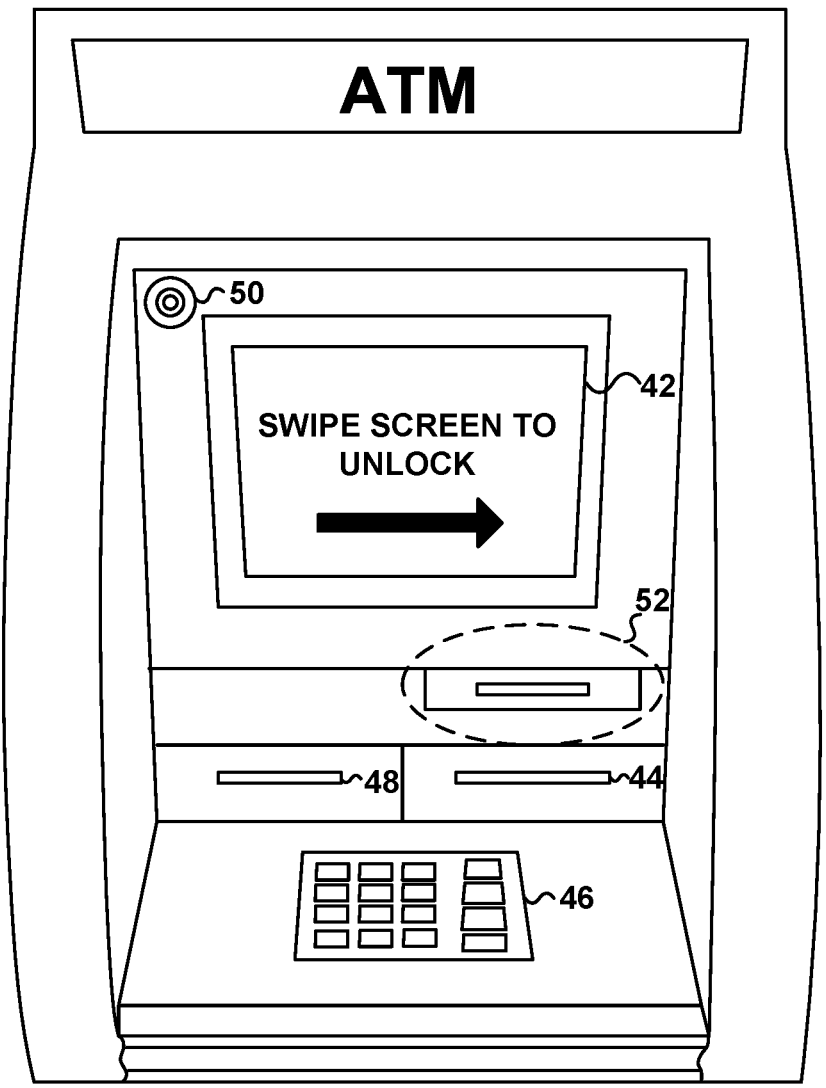
FIG. 2 is a conceptual diagram illustrating an example anti-skimming ATM, in accordance with aspects of the disclosure.

FIG. 2 is a conceptual diagram illustrating an example anti-skimming ATM 40, in accordance with aspects of the disclosure. Anti-skimming ATM 40 includes a display 42, a card reader component 52, a surveillance camera 50, and a keypad 46. Anti-skimming ATM 40 may operate substantially similar to anti-skimming computing device 12 from FIG. 1. For example, anti-skimming ATM 40 may be in communication with anti-skimming server 22 via network 20 from FIG. 1. The architecture of anti-skimming ATM 40 illustrated in FIG. 2 is shown for exemplary purposes only, and anti-skimming ATM 40 should not be limited to this architecture. In some examples, anti-skimming ATM 40 may include additional components that, for clarity, are not shown in FIG. 2. In other examples, anti-skimming ATM 40 may be configured in a variety of ways.

Anti-skimming ATM 40 may contain a cash dispenser 44 and a printer component 48. Cash dispenser 44 may dispense cash to a user of anti-skimming ATM 40, such as during a withdrawal transaction. Printer component 48 may print receipts for various transactions and/or account balance checks performed using anti-skimming ATM 40. In some examples, cash dispenser 44 and/or printer component 48 may include different components such as, for example, components for accepting cash, a component for vending/accepting checks, a component to dispense envelopes, or the like. Anti-skimming ATM 40 may contain two components such as cash dispenser 44 and printer component 48, or anti-skimming ATM 40 may contain fewer or greater components for performing financial transactions using anti-skimming ATM 40, in accordance with aspects of the disclosure.

Anti-skimming ATM 40 may include a display 42 for inputting information, performing transactions, showing informational videos, or the like. A GUI presented on display 42 may allow a user to interact with anti-skimming ATM 40 by display of graphical icons and visual indicators. For example, display 42 may present a GUI that displays recommended actions and/or other options to a user. In certain examples, display 42 may be a touch sensitive screen and may present one or more touch sensitive GUI elements. For example, a user may be able to interact with anti-skimming ATM 40 to respond to options displayed on display 42 and initiate an action by touching one or more of the touch sensitive GUI elements displayed on display 42. For example, display 42 may be a presence-sensitive display that displays a GUI and receives input from a user using capacitive, inductive, and/or optical detection at or near the presence sensitive display. Additionally, or alternatively, a user may be able to interact with anti-skimming ATM 40 to respond to options displayed on display 42 and initiate an action by using any suitable input device such as, for example, keypad 46, a touchpad, a biometric input device, and/or any other suitable input device. Display 42 may include a cathode ray tube (CRT) monitor, a liquid crystal display (LCD), organic light emitting diode (OLED), or any other type of display device that can generate intelligible output to a user.

In some examples, display 42 may present a user interface in which a user may perform an action in order to unlock the screen and begin using anti-skimming ATM 40. For example, as shown in FIG. 2, display 42 may show an introduction user interface that directs the user to touch display 42 anywhere or to swipe his or her finger or hand across display 42 in the direction of an arrow, or that directs the user to push any button on keypad 46 to unlock the screen. Upon unlocking the screen, display 42 may then present an informational video to the user. The informational video may include details about skimming devices, such as, for example, how they work, what they look like, or how to detect them. The informational video may instruct the user to check anti-skimming ATM 40 for the presence of a skimming device prior to allowing the user to perform a financial transaction. Display 42 may prompt the user to input a response before presenting a display used to initiate a transaction. In some examples, the response may be the user pushing a button using display 42 or keypad 46 indicating that he or she did not notice a skimming device present on anti-skimming ATM 40. Upon receiving the response, display 42 may present a screen allowing the user to perform various transactions using anti-skimming ATM 40.

Anti-skimming ATM 40 may include card reader component 52. Card reader component 52 includes a card slot that allows the user to insert his or her debit, credit, or ATM card (hereinafter, "card") to preform financial transactions using anti-skimming ATM 40. In some examples, anti-skimming ATM 40 may prompt the user to input a PIN in order to authenticate the user prior to performing the financial transaction. A display may prompt the user to enter the PIN, and the user may enter the PIN using display 42 or keypad 46. Upon receipt of the PIN and authentication of the user, anti-skimming ATM 40 may allow the user to perform a transaction. In other examples, a fingerprint or retinal scan may be entered using a biometric input device and used to authenticate the user. Card reader component 52 may also help prevent a user's identifying information from being captured in the event a skimming device is affixed to anti-skimming ATM 40.

Figure 3:
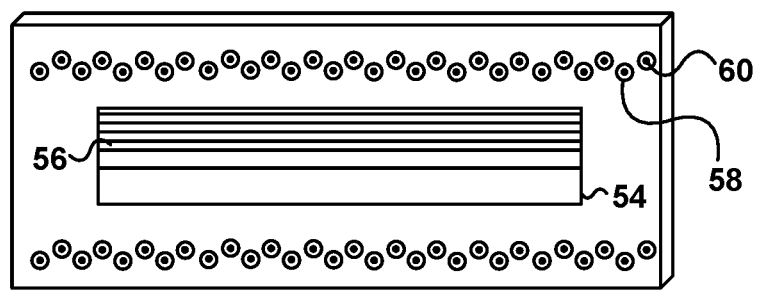
FIG. 3 is a conceptual diagram illustrating an example card reader component of the anti-skimming ATM of FIG. 2 in greater detail.

FIG. 3 is a conceptual diagram illustrating an example card reader component 52 of the anti-skimming ATM 40 of FIG. 2 in greater detail. Card reader component 52 includes card slot 54 that may accept a user's card. Card reader component 52 includes a card reader within card slot 54 that is configured to allow a user to perform transactions using the anti-skimming ATM. The card reader may be located internally of card reader component 52.

Card slot 54 may accept the user's card and direct the card to the card reader. The card reader may be configured to read identifying information stored on a magnetic stripe, a chip, or the like of the card to obtain identifying information of the user. For example, the identifying information may be the user's name, bank account information, PIN number, or the like. In some examples, card slot 54 may return the card to the user prior to completing the transaction. In other examples, card slot 54 may return the card to the user after completing the transaction. In yet another example, the user may swipe the card using card slot 54 rather than insert the card into card slot 54.

Card reader component 52 may include a plurality of micro cameras 60. Plurality of micro cameras 60 may be positioned proximate to the card reader. In some examples, card reader component 52 may include a protective housing or a face which surrounds card slot 54 and where the card reader is internally located. In some such examples, plurality of micro cameras 60 may be located on, within, and/or behind the protective housing or face of card reader component 52. Plurality of micro cameras 60 may help detect the presence of a skimming device affixed to the anti-skimming ATM. For example, an obscured image obtained by one or more of plurality of micro cameras 60 may mean that a skimming device has been affixed over card reader component 52. Plurality of micro cameras 60 may be in a certain pattern or contain a certain number of cameras. For example, plurality of micro cameras 60 may be on two sides of the card reader component 52 (as shown in FIG. 3), on three sides of card reader component 52, on four sides of card reader component 52, or the like. Plurality of micro cameras 60 may be in a distinct pattern, or may be randomly placed around card reader component 52. Plurality of micro cameras 60 may include any number of micro cameras, such as, for example, twenty micro cameras. Further, plurality of micro cameras 60 may be sized and/or located so that a user of the anti-skimming ATM may not be able to tell that the anti-skimming ATM includes plurality of micro cameras 60. Additionally, or alternatively, plurality of micro cameras 60 may include a single camera with multiple apertures to capture images. In some such examples, the apertures may be sized and/or located so that a user of the anti-skimming ATM may not be able to tell that the anti-skimming ATM includes the multiple apertures that are configured to capture images.

In some examples, plurality of micro cameras 60 may be directly on or within card reader component 52. In other examples, plurality of micro cameras 60 may be located behind or around card reader component 52, such as, for example, behind the protective housing of card reader component 52. In this way, card reader component 52 and plurality of micro cameras 60 may be retrofit onto an existing ATM to make the ATM an anti-skimming ATM, or the anti-skimming ATM may be a new ATM. In either example, plurality of micro cameras 60 may be positioned proximate to the card reader.

In some examples, a plurality of lights may be used in place of plurality of micro cameras 60. The plurality of lights may be used in combination with one or more light sensors to help detect the presence of a skimming device affixed to the anti-skimming ATM. For example, a decrease in the intensity of one or more of the plurality of lights may mean that a skimming device has been affixed over card reader component 52. The plurality of lights may be positioned proximate to the card reader. The plurality of lights may be in a certain pattern or contain a certain number of lights. For example, the plurality of lights may be on 2 sides of the card reader component 52, on 3 sides of card reader component 52, on 4 sides of card reader component 52, or the like. The plurality of lights may be in a distinct pattern, or they may be placed randomly around card reader component 52. The plurality of lights may include any number of lights. Further, the plurality of lights may be sized and/or located so that a user of the anti-skimming ATM may not be able to tell that the anti-skimming ATM includes the plurality of lights. In some examples, the plurality of lights may be light emitting diodes (LEDs).

Card reader component 52 may further include a plurality of holes 58. In some examples, plurality of holes 58 are aligned with plurality of micro cameras 60 in order for plurality of micro cameras to be able to have a line of sight to the exterior of card reader component 52. Plurality of holes 58 may allow plurality of micro cameras 60 to be offset from the protective housing or face of card reader component 52. This may help prevent a user from seeing plurality of micro cameras 60, while still allowing the micro cameras to obtain a clear image through the hole opening (when a skimming device is not obscuring the images of plurality of micro cameras 60). Plurality of holes 58 may be around the perimeter of card slot 54 in substantially the same pattern and quantity as plurality of micro cameras 60. Plurality of holes 58 may be sized and/or located so that a person using the anti-skimming ATM may not be able to tell that the ATM is an anti-skimming ATM. In the case in which plurality of micro cameras 60 are directly on or within card reader component 52, card reader component 52 may or may not include plurality of holes 58. In the case in which plurality of micro cameras 60 are located behind or around card reader component 52, plurality of holes 58 may extend partially or substantially through card reader component 52 to where plurality of micro cameras 60 are located. The plurality of holes 58 may be configured in any way conceivable as to allow plurality of micro cameras 60 to be able to capture images to help detect the presence of a skimming device while also being discrete, in accordance with aspects of the disclosure.

Plurality of holes 58 may be configured in substantially the same way in the case where a plurality of lights and one or more light sensors are utilized in place of or in addition to plurality of micro cameras 60.

Card reader component 52 may include a shutter 56. Shutter 56 may be configured to close over the card reader and/or card slot 54 to prevent transactions using the card reader of card reader component 52. In some examples, shutter 56 may remain open unless the anti-skimming ATM has detected a skimming device. In other examples, shutter 56 may remain closed until after a user has watched an informational video and acknowledged looking for a skimming device, e.g., through the use of display 42 or keypad 46 from FIG. 2. In any case, shutter 56 may close and remain closed if the anti-skimming ATM detects a skimming device. In this way, shutter 56 may prevent a user from inserting or swiping a card when a skimming device is present, and may prevent the skimming device from obtaining identifying information contained on the card. Further, the anti-skimming ATM may display an "out of operation" message if shutter 56 is closed due to the presence of a skimming device. Shutter 56 may remain closed until the skimming device is no longer detected, may remain closed for a predetermined amount of time, or may remain closed until the anti-skimming ATM receives a notification that shutter 56 can be opened, e.g., from anti-skimming server 22 from FIG. 1.

Although card reader component 52 is described with respect to an anti-skimming ATM, card reader component 52 should not be limited to anti-skimming computing devices that are ATMs. For example, card reader component may be included on a "pay at the pump" gas station terminal, a "self-checkout" store terminal, or another computing device having a card reader.

Figure 4:
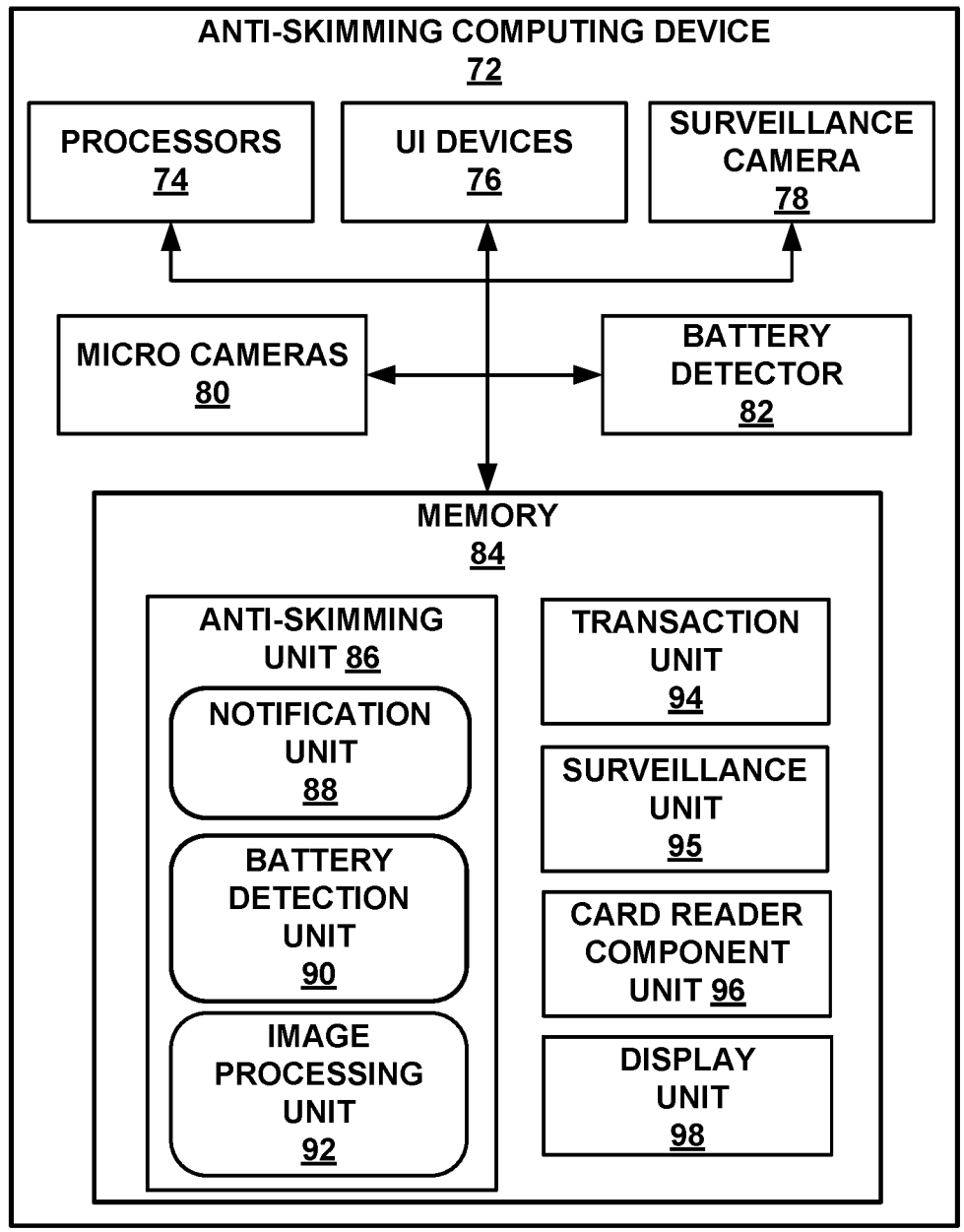
FIG. 4 is a block diagram illustrating an example anti-skimming computing device, in accordance with aspects of the disclosure.

FIG. 4 is a block diagram illustrating an example anti-skimming computing device 72, in accordance with the aspects of the disclosure. Anti-skimming device may be an ATM, a "pay at the pump" gas station terminal, a "self-checkout" store terminal, or another computing device having a card reader. Anti-skimming computing device 72 may operate substantially similar to anti-skimming computing device 12 from FIG. 1. Anti-skimming computing device 72 may be in communication with anti-skimming server 22 via network 20 from FIG. 1. The architecture of anti-skimming computing device 72 illustrated in FIG. 4 is shown for exemplary purposes only, and anti-skimming computing device 72 should not be limited to this architecture. In some examples, anti-skimming computing device 72 may include additional components that, for clarity, are not shown in FIG. 4. In other examples, anti-skimming computing device 72 may be configured in a variety of ways.

As shown in the example of FIG. 4, anti-skimming computing device 72 includes one or more processors 74, one or more interfaces 76, a surveillance camera 78, a plurality of micro cameras 80, a battery detector 82, and one or more memory units 84. Anti-skimming computing device 72 also includes anti-skimming unit 86, transaction unit 94, surveillance unit 95, card reader component unit 96, and display unit 98, each of which may be implemented as program instructions and/or data stored in memory 84 and executable by processors 74 or implemented as one or more hardware units or devices of anti-skimming computing device 72. In some examples, memory 84 of anti-skimming computing device 72 may also store an operating system executable by processors 74. The operating system stored in memory 84 may control the operation of components of anti-skimming computing device 72. The components, units or modules of anti-skimming computing device 72 are coupled (physically, communicatively, and/or operatively) using communication channels for inter-component communications. In some examples, the communication channels may include a system bus, an inter-process communication data structure, or any other method for communicating data.

Processors 74, in one example, may include one or more processors that are configured to implement functionality and/or process instructions for execution within anti-skimming computing device 72. For example, processors 74 may be capable of processing instructions stored by memory 84. Processors 74 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 84 may be configured to store information within anti-skimming computing device 72 during operation. Memory 84 may include a computer-readable storage medium. In some examples, memory 84 includes one or more of a short-term memory or a long-term memory. Memory 84 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 84 is used to store program instructions for execution by processors 74. Memory 84 may be used by software running on anti-skimming computing device 72 (e.g., anti-skimming unit 86, transaction unit 94, surveillance unit 95, card reader component unit 96, display unit 98) to temporarily store information during program execution.

Anti-skimming computing device 72 may utilize UI devices 76 to communicate with external devices via one or more networks, e.g., network 20 from FIG. 1, or via wireless signals. UI devices 76 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, anti-skimming computing device 72 utilizes UI devices 76 to wirelessly communicate with an external device such anti-skimming server 22 from FIG. 1.

Anti-skimming computing device 72 may also use UI devices 76 to communicate with users of anti-skimming computing device 72. UI devices 76 may be configured to operate as both input devices and output devices. For example, UI devices 76 may be configured to receive tactile, audio, or visual input from a user of anti-skimming computing device 72. In addition to receiving input from a user, UI devices 76 may be configured to provide output to a user using tactile, audio, or video stimuli. In one example, UI devices 76 may be configured to output content for display, e.g., a GUI, in accordance with a user interface unit stored in memory 84. In this example, UI devices 76 may include a presence-sensitive display that displays a GUI and receives input from a user using capacitive, inductive, and/or optical detection at or near the presence sensitive display. Other examples of UI devices 76 include a keypad, touchpad, a voice responsive system, video camera, microphone or any other type of device for detecting a command from a user, or a sound card, a video graphics adapter card, or any other type of device for converting a signal into an appropriate form understandable to humans or machines. Additional examples of UI devices 76 include a speaker, a CRT monitor, a LCD, OLED, or any other type of device that can generate intelligible output to a user.

Anti-skimming computing device 72 may include additional components that, for clarity, are not shown in FIG. 4. Similarly, the components of anti-skimming computing device 72 shown in FIG. 4 may not be necessary in every example of anti-skimming computing device 72.

Memory 84 of anti-skimming computing device 72 includes anti-skimming unit 86. anti-skimming unit 86 may allow anti-skimming computing device 72 to detect the presence of a skimming device affixed to anti-skimming computing device 72. Anti-skimming unit 86 may use a sequence of detection methods to determine if a skimming device is present. For example, image processing unit 92 of anti-skimming unit 86 may analyze one or more images captured by plurality of micro cameras 80. Image processing unit 92 may obtain one or more images captured by one or more of the plurality of micro cameras 80. Image processing unit 92 may use the images to determine if one or more of the plurality of micro camera 80 has captured an image that is obscured. Image processing unit 92 may compare the captured images to images previously captured as baseline images. The images previously captured may have been captured during the set-up of anti-skimming computing device 72, may be the last images captured by plurality of micro cameras 80, or the like. Image processing unit 92 may determine if changes exist between the images, such as, for example, color darkening, decrease in sharpness of the image, decrease in brightness of the image, increase in the amount of shadows in the image, the image being blurred or blocked by an object, or any other detail that could indicate that one or more of the plurality of micro cameras 80 is blocked or impeded by an object. In some examples, image processing unit 92 compares the images to images that are stored in an anti-skimming server, e.g., anti-skimming server 22 from FIG. 1. In other examples, image processing unit 92 compares the images to images that are stored in memory 84 of anti-skimming computing device 72. Image processing unit 92 may compare images obtained from the same micro camera at different times, use comparison data from multiple images or micro cameras, or both. In some examples, image processing unit 92 is precise enough to determine a change in one or more images captured by plurality of micro cameras 80 due to a transparent object affixed over a card reader component. For example, a blurred image may indicate the presence of a transparent skimming device, whereas a completely blocked image may indicate the presence of an opaque skimming device. In some examples, image processing unit 92 may operate continuously in order to detect an object affixed over a card reader component in real-time.

Upon indication that an image from one or more of the plurality of micro cameras 80 is obscured, image processing unit 92 may notify battery detection unit 90. Battery detection unit 90 may turn on and/or initiate battery detector 82. Battery detector 82 may be able to detect the presence of an external battery near the card reader, e.g., an external battery used to power a skimming device. In this way, the techniques of the disclosure uses a two-stage process to determine if a skimming device is present.

In some examples, plurality of micro cameras 80 may be sensitive to changes detected and battery detection unit 90 may consequently turn on and/or initiate battery detector 82 often. In other examples, plurality of micro cameras 80 may be configured so that a detected change may need to be present for a predetermined amount of time prior to turning on and/or initiating battery detector 82. If plurality of micro cameras 80 are configured to require a detected change to be present for a certain amount of time, battery detector 82 may be prevented from being turned on and/or initiated often or due to the presence of a user's hand, a shadow, or the like blocking one or more of the plurality of micro cameras 80. However, anti-skimming computing device 72 may be connected to a power source, and turning on and/or initiating battery detector 82 often may not be a concern. In still another example, battery detector 82 may remain on at all times. In some such examples, the information obtained by battery detector 82 may not be analyzed unless image processing unit 92 also determines that one or more images from the plurality of micro cameras 80 is obscured. In this way, battery detector 82 may always be turned on, but battery detector 82 may not be initiated unless image processing unit 90 determines that one or more images from the plurality of micro cameras 80 is obscured. As used herein with respect to battery detector 82, "initiate" refers to obtaining and analyzing the data captured by battery detector 82, whereas "turn on" refers to the physical act of powering on battery detector 82.

In some examples, battery detector 82 includes circuitry configured to detect the presence of an external battery near the card reader. For example, battery detector 82 may include an integrated circuit.

Battery detector 82 may operate though a non-invasive technique, e.g., a technique that does not require battery detector 82 to be in connection with an external battery, such as, an external battery included in a skimming device. In order to be non-invasive, battery detector 82 may be a sensor that is able to detect the presence of a static magnetic field created by the flow of current in the skimming device, rather than detect a current flowing in the skimming device including the external battery. For example, an external battery may use a battery that provides a direct-current (DC) power source. The current provided by the DC power source may have a frequency of zero, and thus a non-invasive method may be unable to detect the frequency. However, the DC power source may generate a static magnetic field which may be able to be detected using a non-invasive method, and therefore detect the presence of the skimming device including the external battery.

In some examples, battery detector 82 may be a Hall Effect sensor, e.g., a non-invasive sensor to detect the presence of a static magnetic field. A Hall Effect sensor may generate a measurable voltage as an output signal upon exposure to a static magnetic field, e.g., from a DC power source of an external battery of a skimming device. In some examples, battery detector 82 may additionally or alternatively include a linear circuit that provides a constant output signal to battery detection unit 90. The output signal may be distorted, amplified, and/or attenuated due to the presence of an external battery. Battery detection unit 90 may analyze the output signal of battery detector 82 to determine if an external battery is present. For example, battery detection unit 90 may compare the output signal of battery detector 82, such as a voltage generated by a Hall Effect sensor, to a predetermined threshold value. In some such examples, battery detection unit 90 may determine that an external battery is present near the card reader if the output signal of battery detector 82 is greater than the predetermined threshold value. In other examples, battery detection unit 90 may determine that an external battery is present near the card reader if the output signal of battery detector 82 is less than the predetermined threshold value. In yet another example, battery detection unit 90 may determine that an external battery is present near the card reader if the output signal of battery detector 82 is attenuated, amplified, and/or otherwise distorted.

Although battery detector 82 is described herein as a Hall Effect sensor, in other examples, battery detector 82 may be any sensor or device configured to detect the presence of an external battery. In cases in which battery detector 82 is not a Hall Effect sensor, battery detector 82 may still use a non-invasive method to detect the presence of an external battery near the card reader.

In some examples, battery detector 82 may operate for a predetermined amount of time. For example, battery detector 82 may remain initiated and searching for an external battery for 5 minutes. If battery detector 82 does not detect an external battery within the predetermined amount of time, battery detection unit 90 may turn off battery detector 82. In other examples, battery detector 82 may remain on at all times, but battery detector 82 may only be initiated for a predetermined amount of time. For example, battery detector 82 may be initiated for a predetermined amount of time and then enter a "sleep mode" in which battery detector 82 remains on but is not initiated. In some such examples, battery detector 82 may operate in a cycle in which battery detector 82 is initiated for a predetermined amount of time and then battery detector 82 is in "sleep mode" for a predetermined amount of time before being initiated again for the predetermined amount of time.

If battery detector 82 detects the presence of an external battery, battery detection unit 90 may transmit an alert to notification unit 88 that an external battery is detected and that there may be a skimming device present on anti-skimming computing device 72.

Notification unit 88 may alert other units within anti-skimming computing device 72 about the skimming device and may transmit data captured by anti-skimming computing device 72 to an anti-skimming server, e.g., anti-skimming server 22 from FIG. 1. If battery detector 82 remains on at all times, battery detection unit 90 may only be initiated if the image processing unit 92 also determines that an image from plurality of micro cameras is obscured. In this way, battery detection unit 90 may transmit an alert to notification unit 88 that an external battery is detected if image processing unit 92 has also determined that one or more images from the plurality of micro cameras 80 is obscured. In turn, anti-skimming computing device 72 may prevent false alarms being transmitted to notification unit 88 due to the use of two different skimming device detection devices, e.g., plurality of micro cameras 80 and battery detector 82.

Notification unit 88 may alert card reader component unit 96 of the potential skimming device on anti-skimming computing device 72. Card reader component unit 96 may close a shutter on the card reader component, e.g., shutter 56 from FIG. 3. This may prevent a card from being inserted or swiped, and therefore may prevent identifying information from being captured by a skimming device present on anti-skimming computing device 72. The shutter may remain closed until the skimming device is no longer detected, may remain closed for a predetermined amount of time, or may remain closed until anti-skimming computing device 72 receives a message that the shutter can be opened. For example, in the case in which the shutter remains closed for a predetermined amount of time, the shutter may remain closed for a predetermined amount of time, e.g., thirty minutes, and then anti-skimming computing device may determine if a skimming device is still present. If anti-skimming computing device 72 determines that the skimming device is still present, the shutter may remain closed. If anti-skimming computing device 72 determines that the skimming device is not present, then card reader component unit 96 may open the shutter. In some examples, anti-skimming computing device 72 may receive the message that the shutter can be opened in response to an employee or another authority physically removing the skimming device from anti-skimming computing device 72.

Notification unit 88 may also alert surveillance unit 95 of the potential skimming device on anti-skimming computing device 72. Surveillance unit 95 may initiate and begin recording a video or capture images using surveillance camera 78. Surveillance camera 78 may be located on the front of anti-skimming computing device 72, and may attempt to capture images or a video including the face of a bad actor attaching a skimming device or walking away from anti-skimming computing device 72 in order to capture the identity of that person. Surveillance unit 95 may send captured images, videos, and/or a live stream of the video to an anti-skimming server, e.g. anti-skimming server 22 from FIG. 1. Surveillance camera 78 may capture images and/or record videos until the skimming device is no longer detected, for a predetermined amount of time, or until anti-skimming computing device 72 receives a message that the recording can be stopped.

Notification unit 88 may alert display unit 98 of the potential skimming device on anti-skimming computing device 72. Display unit 98 may configure a display on anti-skimming computing device 72 to display an "out of operation" message or the like. The message may also result in anti-skimming computing device 72 locking one or more user interface devices of anti-skimming computing device 72 to prevent a transaction from occurring using the card reader of anti-skimming computing device 72, and therefore may prevent identifying information from being captured by a skimming device affixed over the card reader component of anti-skimming computing device 72. The display may show the message until the skimming device is no longer detected, for a predetermined amount of time, or until the anti-skimming computing device 72 receives a message that normal operation of anti-skimming computing device 72 can resume.

Notification unit 88 may further alert transaction unit 94 of the potential skimming device on anti-skimming computing device 72. Transaction unit 94 may then prevent any financial transactions from taking place using anti-skimming computing device 72. For example, transaction unit 94 may configure anti-skimming computing device 72 so that financial transaction options, such as, for example, deposits, withdrawals, sales, etc., are no longer presented as an option on anti-skimming computing device 72. As described above, this too may prevent identifying information from being captured by a skimming device present on anti-skimming computing device 72. Transaction unit 94 may prevent transactions from occurring until the skimming device is no longer detected, for a predetermined amount of time, or until anti-skimming computing device 72 receives a message that transactions can resume.

Notification unit 88 may also transmit detection of the skimming device to an anti-skimming server. In some examples, notification unit 88 may receive instructions from the anti-skimming server, such as, for example, instructions to enact security measures on anti-skimming computing device 72.

In normal operation, card reader component unit 96, surveillance unit 95, display unit 98, and/or transaction unit 94 may perform functions related to transactions occurring at anti-skimming computing device 72. As used herein, "normal operation" refers to the operation of anti-skimming device 72 when a skimming device has not been detected, e.g., through the use of image processing unit 92 and battery detection unit 90, such as, for example, transactions performed using an ATM, a "pay at the pump" gas station terminal, a "self-checkout" store terminal, or another computing device having a card reader.

In some examples, card reader component unit 96 may read identifying information from a magnetic stripe, chip, or the like of a card inserted or swiped using the card reader component. Card reader component unit 96 may also verify the identity of a user using a PIN or the like entered by the user through communication with an anti-skimming server. Card reader component unit 96 may communicate with display unit 98 to prompt the user to perform actions, such as, for example, to insert or swipe a card, to enter a PIN, or the like.

In some examples, surveillance unit 95 may initiate surveillance camera 78 during normal operation while a transaction is taking place using anti-skimming computing device 72. In some examples, surveillance unit 95 may initiate surveillance camera 78 in additional or alternative instances during normal operation.

Display unit 98 may operate the display on anti-skimming computing device 72 to allow for normal operation of anti-skimming computing device 72. Display unit 98 may configure the display to present an informational video, e.g., as described with respect to FIG. 2. Display unit 98 may also configure the display to allow the user to make selections, input information, and perform financial transactions using anti-skimming computing device 72.

Transaction unit 94 may configure anti-skimming computing device 72 to perform transactions. Transaction unit 94 may communicate with an anti-skimming server to determine if a user has sufficient funds to perform a transaction. In some examples, transaction unit 94 may also configure anti-skimming computing device 72 to accept or deliver the funds as required by a transaction. In some examples, transaction unit 94 may operate to allow financial transactions, e.g., in the case where anti-skimming computing device is an ATM. In other examples, transaction unit 94 may operate to allow transactions regarding the sale or purchase of goods, e.g., in the case where anti-skimming computing device 72 is a "pay at the pump" gas station terminal or a "self-checkout" store terminal. Transaction unit 94 may communicate with display unit 98 to prompt the user for information, notify the user of the transaction status, or the like.

Figure 5:
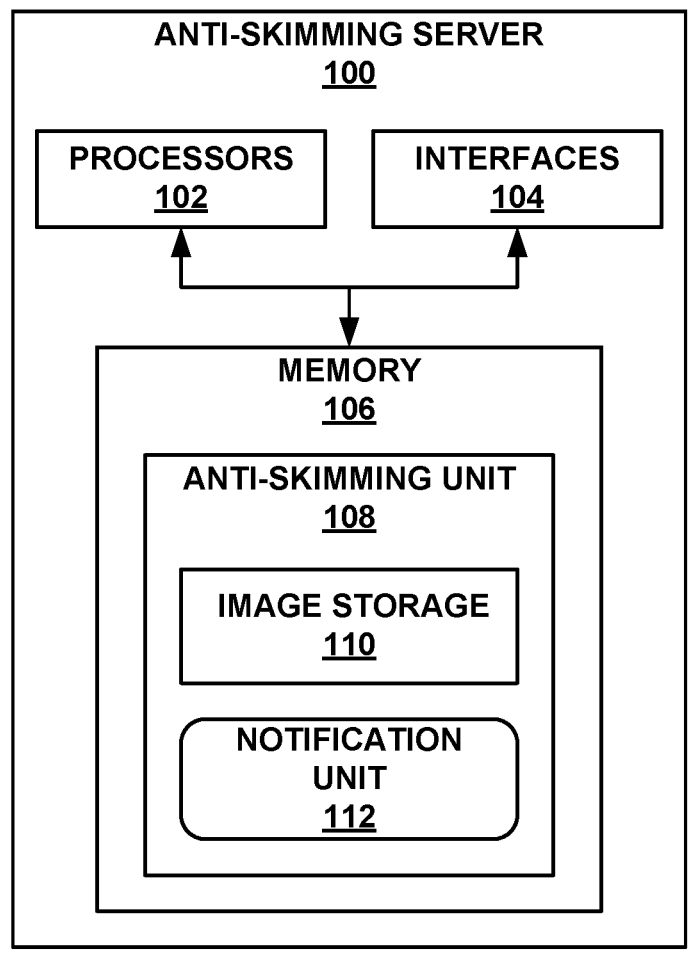
FIG. 5 is a block diagram illustrating an example anti-skimming server, in accordance with aspects of the disclosure.

FIG. 5 is a block diagram illustrating an example anti-skimming server 100, in accordance with the aspects of the disclosure. Anti-skimming server 100 may be a part of a financial institution network, e.g., financial institution network 30 from FIG. 1. Anti-skimming server 100 may operate substantially similar to anti-skimming server 22 from FIG. 1. For example, anti-skimming server 100 may communicate with anti-skimming computing device 12 via network 20 from FIG. 1. The architecture of anti-skimming server 100 illustrated in FIG. 5 is shown for exemplary purposes only and anti-skimming server 100 should not be limited to this architecture. In other examples, anti-skimming server 100 may be configured in a variety of ways.

As shown in the example of FIG. 5, anti-skimming server 100 includes one or more processors 102, one or more interfaces 104, and one or more memory units 106. Memory 106 of anti-skimming server 100 includes anti-skimming unit 108, which is executable by processors 102. Each of the components, units, or modules of anti-skimming server 100 are coupled (physically, communicatively, and/or operatively) using communication channels for inter-component communications. In some examples, the communication channels may include a system bus, a network connection, an inter-process communication data structure, or any other method for communicating data.

Processors 102, in one example, may include one or more processors that are configured to implement functionality and/or process instructions for execution within anti-skimming server 100. For example, processors 102 may be capable of processing instructions stored by memory 106. Processors 102 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 106 may be configured to store information within anti-skimming server 100 during operation. Memory 106 may include a computer-readable storage medium or computer-readable storage device. In some examples, memory 106 includes one or more of a short-term memory or a long-term memory. Memory 106 may include, for example, random access memories (RAM), dynamic random access memories (DRAM), static random access memories (SRAM), magnetic discs, optical discs, flash memories, or forms of electrically programmable memories (EPROM), or electrically erasable and programmable memories (EEPROM). In some examples, memory 106 is used to store program instructions for execution by processors 102. Memory 106 may be used by software or applications running on anti-skimming server 100 (e.g., anti-skimming unit 106) to temporarily store information during program execution.

Anti-skimming server 100 may utilize interfaces 104 to communicate with external devices via one or more networks, e.g., network 20 from FIG. 1, or via wireless signals. Interfaces 104 may be network interfaces, such as Ethernet interfaces, optical transceivers, radio frequency (RF) transceivers, or any other type of devices that can send and receive information. Other examples of interfaces may include Wi-Fi, near-field communication (NFC), or Bluetooth radios. In some examples, anti-skimming server 100 utilizes interfaces 104 to communicate with an external device such as anti-skimming computing device 12 from FIG. 1.

Anti-skimming unit 108 includes image storage 110 and notification unit 112. Image storage 110 stores images from a plurality of micro cameras of an anti-skimming computing device, e.g., micro cameras 16 of anti-skimming computing device 12 from FIG. 1. Image storage 110 includes images previously captured by the plurality of micro cameras that can be used to determine if one or more of the current images from the plurality of micro cameras is obscured, such as due to the presence of a skimming device. In some examples, image storage 110 includes all of the images captured by the plurality of micro cameras. In other examples, image storage 110 includes less than all of the images captured by the plurality of micro cameras. For example, image storage 110 may include the most recent images from the plurality of the micro cameras. In some examples, image storage 110 may include baseline images. The baseline images may be images previously captured, such as, for example, images captured during the set-up of the anti-skimming computing device, the last images captured by the plurality of micro cameras, or the like. In some examples, the anti-skimming computing device accesses the images stored in image storage 110 in order to determine if one or more of the current images from the plurality of micro cameras is obscured. Alternatively, or in addition, to image storage 110, the anti-skimming computing device may store the images previously captured by the plurality of micro cameras.

Notification unit 112 may send notifications to an anti-skimming computing device and/or one or more support servers, e.g., alert system server 28, forensic analysis server 26, and data analytics prediction server 24 from FIG. 1, via interfaces 104. The notifications to the anti-skimming computing device may include instructions relating to security measures to be performed by the anti-skimming computing device. In some examples, notification unit 112 may send instructions to the anti-skimming computing device in response to a notification indicating the presence of a skimming device affixed to the anti-skimming computing device. For example, notification unit 112 may send instructions to the anti-skimming computing device to close a shutter on a card reader component, initiate a surveillance camera, display an "out of operation" message, or the like in lieu of the anti-skimming computing device initiating the security measures.

In other examples, the anti-skimming computing device may enact the security measures itself, without receiving instructions from notification unit 112. In yet another example, notification unit 112 may override a security measure initiated by the anti-skimming computing device. For example, notification unit 112 may have access to additional information about the skimming attack, e.g., from the support servers, and may determine that one or more security measures are not necessary. In some examples, notification unit 112 may send instructions to an anti-skimming computing device to enact security measures due to the presence of a skimming device detected on another anti-skimming computing device located within a surrounding area. In this way, notification unit 112 may have a global view of a network of anti-skimming computing devices, and may send the instructions as preemptive security measure, e.g., in the case where a potential future skimming attack is suspected.

Notification unit 112 may also send instructions to the anti-skimming computing device to resume normal operation. For example, in the case in which the anti-skimming computing device was displaying an "out of operation" message due to the presence of a skimming device, notification unit 112 may send the anti-skimming computing device instructions to resume normal operation after the skimming device is removed by an authority.

Notification unit 112 may send notifications to one or more support servers. In some examples, the notification may include data, video, images, or the like that relate to a skimming device affixed to an anti-skimming computing device. For example, anti-skimming server 100 may receive images and/or videos from an anti-skimming device and/or a surrounding surveillance camera, and may send the images and/or videos to one or more of a forensic analysis server, a data analytics prediction server, or an alert system server. Notification unit 112 may also receive notifications and/or instructions from the support servers. In some examples, notification unit 112 may send instructions to one or more of the support servers to initiate one or more surrounding surveillance cameras. In other examples, notification unit 112 may initiate one or more surrounding surveillance cameras.

Figure 6:
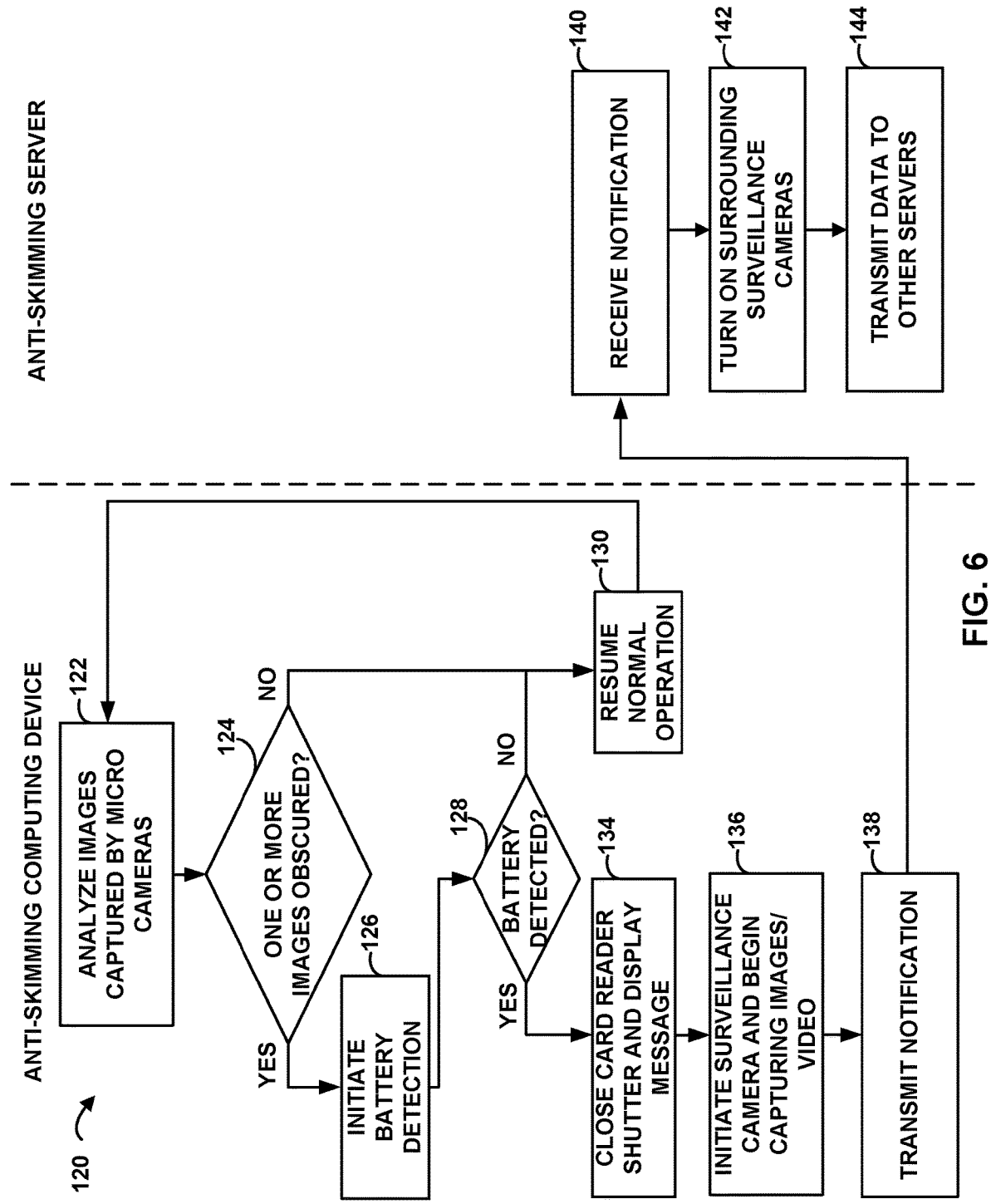
FIG. 6 is a flow diagram illustrating an example technique to detect a skimming device affixed over a card reader component of a computing device, in accordance with aspects of the disclosure.

FIG. 6 is a flow diagram illustrating an example technique 120 to detect a skimming device affixed over a card reader component of a computing device, in accordance with aspects of the disclosure. The example technique of FIG. 6 will be described with respect to network system 10 of FIG. 1 and anti-skimming computing device 72 of FIG. 4.

Anti-skimming computing device 72 analyzes images captured by a plurality of micro cameras 80 positioned on the computing device 72 proximate to a card reader component of computing device 72 (122). Anti-skimming computing device 72 then determines whether any of the images captured by the plurality of micro cameras 80 are obscured (124). For example, image processing unit 92 of computing device 72 may analyze the images captured by the plurality of micro cameras 80 in real-time. The images may be analyzed in order to determine if one or more of the images captured by the plurality of micro cameras 80 are obscured (e.g., blurred or blocked) potentially due to the presence of a skimming device affixed over the card reader component of computing device 72. Image processing unit 92 may analyze the images in accordance with aspects of this disclosure described in detail above.

In response to the determination that the one or more of the images of the plurality of micro cameras are obscured (YES branch of 124), anti-skimming computing device 72 initiates a battery detector 82 included in the computing device 72 (126). Battery detector 82 may determine whether an external battery is present near the card reader component of anti-skimming computing device 72 (128). The presence of an external battery near the card reader component of anti-skimming computing device 72 may signify that a skimming device is present. If it is determined that the images captured by plurality of micro cameras 80 are not obscured and/or no external battery is detected by battery detector 82 (NO branches of 124 and 128), anti-skimming computing device 72 may resume normal operation (130).

In response to the battery detector 82 detecting a presence of an external battery near the card reader component of anti-skimming computing device 72 (YES branch of 128), computing device 72 determines that a skimming device is affixed over the card reader component of the computing device 72.

In response to the determination that the skimming device is affixed over the card reader component, a shutter on the card reader component may be closed over the card reader and/or a card slot (134). Closing the shutter may prevent a card from being inserted or swiped, and therefore may prevent identifying information from being captured by a skimming device affixed to anti-skimming computing device 72. The shutter may remain closed until the skimming device is no longer detected, for a predetermined amount of time, or until anti-skimming computing device 72 receives a message that the shutter can be opened.

Additionally, or alternatively, in response to the determination that the skimming device is affixed over the card reader component, display unit 98 may present an "out of operation" message or the like on a display of anti-skimming computing device 72 (134). The message may be shown until the skimming device is no longer detected, for a predetermined amount of time, or until anti-skimming computing device 72 receives a message that normal operation can be resumed, e.g., from anti-skimming server 22.

Surveillance camera 78 of anti-skimming computing device 72 may be initiated and configured to begin capturing images or a video (136). Surveillance camera 78 may attempt to capture the face of a bad actor who may have affixed the skimming device, which may help determine the identity of that person. Surveillance camera 78 may capture images and/or videos until the skimming device is no longer detected, for a predetermined amount of time, or until anti-skimming computing device 72 receives a message that the capturing can be stopped.

Anti-skimming computing device 72 may also transmit a notification to anti-skimming server 22 regarding the potential skimming device (138). The notification may include an alert that a skimming device may be present over a card reader component of anti-skimming computing device 72, one or more images captured by the plurality of micro cameras 80, an image, a video, or a live stream video from surveillance camera 78, or the like.

Anti-skimming server 22 may receive the notification from anti-skimming computing device 72 (140). Anti-skimming server 22 may then initiate surrounding surveillance cameras, e.g., surveillance cameras in the vicinity of anti-skimming computing device 72, to operate in an attempt to help capture one or more images and/or videos of the bad actor, in accordance with the aspects of the disclosure (142). In some examples, anti-skimming server 22 may directly initiate the surrounding surveillance cameras. In other examples, anti-skimming server 22 may communicate with forensic analysis server 26 in order to initiate the surrounding surveillance cameras.

Anti-skimming server 22 may also transmit some or all of the data and information received from anti-skimming computing device 72 and/or the surrounding surveillance cameras to one or more additional servers (144). In some examples, the additional servers may be alert system server 28, forensic analysis server 26, and data analytics prediction server 24. In some examples, the additional servers may perform functions relating to the detection, prediction, and/or prevention of skimming attacks. For example, alert system server 28 may alert an authority of the skimming device affixed to anti-skimming computing device 12, forensic analysis server 26 may store data that may help determine the identity of the bad actor responsible for affixing the skimming device to anti-skimming computing device 12, and data analytics prediction server 24 may predict where a future skimming attack is likely to occur.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A computing device comprising:
a card reader;
at least one camera positioned proximate to the card reader;
a battery detector circuit; and
processing circuitry configured to, in response to a determination that one or more images captured by the at least one camera is obscured, initiate the battery detector circuit to detect whether a battery is present near the card reader.

2. The computing device of claim 1, wherein, to initiate the battery detector circuit, the processing circuitry is configured to:
analyze images captured by the at least one camera;
determine that the one or more of the images is obscured; and
in response to the determination that the one or more of the images is obscured, initiate the battery detector circuit.

3. The computing device of claim 1, wherein the processing circuitry is further configured to, in response to the battery detector circuit detecting the presence of the battery near the card reader, determine that a skimming device affixed over the card reader.

4. The computing device of claim 3, wherein the card reader comprises a card slot and a card reader shutter, and wherein the processing circuitry is configured to, in response to the determination that the skimming device is affixed over the card reader, close the card reader shutter over the card slot to prevent transactions using the card reader.

5. The computing device of claim 3, wherein the processing circuitry is configured to, in response to the determination that the skimming device is affixed over the card reader, one or more of:
initiate a surveillance camera of the computing device to capture one or more images;
lock one or more user interface devices of the computing device to prevent transactions using the card reader from being initiated; or
send a notification of the skimming device to one or more servers via a network connection.

6. A computing device comprising:
a card reader;
at least one camera positioned proximate to the card reader and configured to capture images;
a battery detector circuit configured to detect whether a battery is present near the card reader; and
processing circuitry configured to determine that a skimming device is affixed over the card reader based a determination that one or more of the images captured by the at least one camera is obscured and a determination that the battery is detected by the battery detector circuit.

7. The computing device of claim 6, wherein the processing circuitry is configured to, in response to the determination that the one or more of the images captured by the at least one camera is obscured, initiate the battery detector circuit.

8. The computing device of claim 6, wherein the processing circuitry is configured to:
analyze the images captured by the at least one camera;
determine that the one or more of the images is obscured; and
in response to the determination that the one or more of the images is obscured, initiate the battery detector circuit.

9. The computing device of claim 6, wherein the card reader comprises a card slot and a card reader shutter, and wherein the processing circuitry is configured to, in response to the determination that the skimming device is affixed over the card reader, close the card reader shutter over the card slot to prevent transactions using the card reader.

10. The computing device of claim 6, further comprising a surveillance camera in communication with the processing circuitry, wherein the processing circuitry is configured to, in response to the determination that the skimming device is affixed over the card reader, initiate the surveillance camera to capture one or more images.

11. The computing device of claim 6, further comprising one or more user interface devices including a display in communication with the processing circuitry, wherein the processing circuitry is configured to, in response to the determination that the skimming device is affixed over the card reader, lock the one or more user interface devices to prevent transactions using the card reader from being initiated.

12. The computing device of claim 6, wherein the processing circuitry is configured to, in response to the determination that the skimming device is affixed over the card reader, send a notification of the skimming device to one or more servers via a network connection.

13. The computing device of claim 6, wherein the battery detector circuit comprises a Hall Effect sensor configured to generate a voltage in response to a static magnetic field from a nearby direct current (DC) power source, and wherein the battery detector circuit detects whether the battery is present near the card reader based on a comparison of the voltage to a threshold.

14. A method comprising:
determining, by a computing device having a card reader, at least one camera positioned proximate to the card reader, and a battery detector circuit, that one or more images captured by the at least one camera is obscured;
determining, by the computing device, that a presence of a battery near the card reader is detected by the battery detector circuit; and
in response, determining that a skimming device is affixed over the card reader.

15. The method of claim 14, further comprising, in response to the determination that the one or more images captured by the at least one camera is obscured, initiating the battery detector circuit to detect whether the battery is present near the card reader.

16. The method of claim 14, further comprising:
analyzing images captured by the at least one camera; and
in response to the determination that the one or more of the images is obscured, initiating the battery detector circuit to detect whether the battery is present near the card reader.

17. The method of claim 14, wherein the card reader comprises a card slot and a card reader shutter, the method further comprising, in response to the determination that the skimming device is affixed over the card reader, closing the card reader shutter over the card slot to prevent transactions using the card reader.

18. The method of claim 14, wherein the computing device comprises a surveillance camera in addition to the at least one camera, the method further comprising, in response to the determination that the skimming device is affixed over the card reader, initiating the surveillance camera to capture one or more images.

19. The method of claim 14, wherein the computing device comprises one or more user interface devices including a display, the method further comprising, in response to the determination that the skimming device is affixed over the card reader, locking the one or more user interface devices to prevent transactions using the card reader from being initiated.

20. The method of claim 14, further comprising, in response to the determination that the skimming device is affixed over the card reader, sending a notification of the skimming device to one or more servers via a network connection.

* * * * *